UNITED STATES PATENT OFFICE.

LEOPOLD GRAF, OF NEWARK, NEW JERSEY.

ARTIFICIAL MANURE.

SPECIFICATION forming part of Letters Patent No. 246,121, dated August 23, 1881.

Application filed December 23, 1880. (Specimens.)

*To all whom it may concern:*

Be it known that I, LEOPOLD GRAF, a citizen of the United States, residing at Newark, in the county of Essex and State of New Jersey, have invented new and useful Improvements in Artificial Manure, of which the following is a specification.

This invention relates to an artificial manure which is produced by mixing an alkaline solution of leather-scrap with lime or lime salts, such as sulphate of lime or carbonate of lime, and with phosphate of lime, and then treating the mixture with sulphuric acid.

In carrying out my invention I take leather-scrap, about four pounds; caustic soda or potash, about one pound; water, one and one-half gallon. The leather-scrap which I use is taken from tanned or half-tanned hides and skins, and must not be confused with untanned scraps, which by some persons are also termed "leather scraps." The ingredients above stated are placed in a closed boiler and heated until the pressure rises to from one hundred and thirty to two hundred pounds to the square inch, the heat being kept up for from one to three hours. At the end of this time the leather has dissolved, and the contents of the boiler form a liquid mass. I then mix the liquid leather with gypsum and phosphate of lime in about the following proportion: liquid leather, about five pounds; gypsum, about three pounds; phosphate of lime, about two pounds, the gypsum and phosphate of lime being employed in the form of dry powder. After the liquid leather has been fully absorbed by the gypsum and phosphate of lime, I add to the mass about one-fourth pound of sulphuric acid of 66° Baumé, which is diluted in about an equal volume of water. By the action of this acid the alkali contained in the mass is neutralized, and the compound is rendered slightly acid.

If, instead of gypsum, lime or carbonate of lime is used in the mixture, a correspondingly larger quantity of sulphuric acid must be used, sufficient to convert the lime into sulphate of lime, or gypsum.

If it is desired to increase the quantity of nitrogen in the manure, a proportionately larger quantity of the liquid leather is used in the compound.

After the mixture of liquid leather, gypsum, and phosphate of lime has been treated with sulphuric acid, as above described, I heat the mass, so as to drive out all surplus moisture, and when dry I reduce it to a fine powder and put it up in suitable packages, ready for the market.

The artificial manure hereinbefore described can readily be distinguished from artificial manure manufactured by other modes and means employing leather scraps as one of its components, because the product made according to my invention is a finely-divided powder of a dark-brown color, closely resembling snuff in appearance. It is unctuous to the touch, leaves no stain when rubbed between the fingers or on paper, and comparatively has no granulated substance in its composition. It has the characteristic odor of burned or charred leather, and can easily be distinguished by this feature alone.

I do not claim, *per se*, the employment of leather scraps, either original or dissolved form, as such is a well-known component of artificial manures.

What I claim as new, and desire to secure by Letters Patent, is—

As a new article of manufacture, an artificial manure composed of sulphuric acid and a mixture of liquid leather, gypsum, or its equivalent, and phosphate of lime, and having the essential qualities herein stated, all substantially as described.

In testimony whereof I have hereunto set my hand and seal in the presence of two subscribing witnesses.

L. GRAF. [L. S.]

Witnesses:
W. HAUFF,
E. F. KASTENHUBER.